United States Patent [19]

Hares

[11] 4,251,278
[45] Feb. 17, 1981

[54] PHOTOCHROMIC GLASSES WHICH DARKEN TO A BROWN HUE

[75] Inventor: George B. Hares, Corning, N.Y.

[73] Assignee: Corning Glass Works, Corning, N.Y.

[21] Appl. No.: 113,797

[22] Filed: Jan. 21, 1980

[51] Int. Cl.³ ............................ C03C 3/04; C03C 3/26
[52] U.S. Cl. ................................ 106/47 Q; 65/30 R; 106/54; 106/DIG. 6
[58] Field of Search ..................... 65/DIG. 2, 30 R; 106/DIG. 6, 47 Q, 54

[56] References Cited

U.S. PATENT DOCUMENTS

| | | | |
|---|---|---|---|
| 3,902,909 | 9/1975 | Gliemeroth | 106/DIG. 6 X |
| 4,018,965 | 4/1977 | Kerko et al. | 106/DIG. 6 X |
| 4,043,781 | 8/1977 | DeMunn et al. | 106/DIG. 6 X |
| 4,072,490 | 2/1978 | Illig | 65/30 R |
| 4,134,747 | 1/1979 | Pierson et al. | 106/DIG. 6 X |

FOREIGN PATENT DOCUMENTS 2107343 10/1971 Fed. Rep. of Germany .... 106/DIG. 6

*Primary Examiner*—Helen M. McCarthy
*Attorney, Agent, or Firm*—Clinton S. Janes, Jr.

[57] ABSTRACT

The present invention is primarily directed to transparent photochromic glasses which are essentially colorless in the undarkened state but which exhibit a warm brown coloration in the darkened state. Such glasses utilize silver halide crystals to impart photochromic behavior thereto and contain about 1–10 ppm palladium and/or gold. The instant invention is secondarily directed to silver halide crystal-containing photochromic glasses having in excess of 10 ppm palladium and/or gold which exhibit a brownish tint in the undarkened state and a deeper brown coloration in the darkened state. Through differential heat treatment thereof, the latter glasses can be made to exhibit a gradient optical density brownish tint in the undarkened state and also demonstrate a gradient photochromic darkening behavior to a deeper brownish coloration.

7 Claims, No Drawings

PHOTOCHROMIC GLASSES WHICH DARKEN TO A BROWN HUE

BACKGROUND OF THE INVENTION

Photochromic glasses or phototropic glasses, as such have been variously designated, had their genesis in U.S. Pat. No. 3,208,860. Such glasses become darker (change color) when subjected to actinic radiation, customarily ultraviolet radiation, and fade or assume their original color when removed from the actinic radiation. That patent discloses the utility of silver halide crystals, i.e., silver chloride, silver bromide, and/or silver iodide, in causing the phenomenon and postulates an explanation of the mechanism generating photochromic behavior in those glasses containing silver halide crystals. The patent is directed generally to silicate glasses and specifies minimum amounts of silver and halogens which must be present to impart photochromic behavior thereto. Thus, at least one halogen in the indicated minimum effective proportion of 0.2% chlorine, 0.1% bromine, and 0.08% iodine and a minimum of silver in the indicated proportion of 0.2% in a glass wherein the effective halogen is chlorine, 0.05% in a glass containing at least 0.1% bromine, but less than 0.8% iodine, and 0.03% in a glass containing at least 0.08% iodine must be present.

The patent notes the preferred base glass compositions as being included within the $R_2O$—$Al_2O_3$—$B_2O_3$—$SiO_2$ system. Accordingly, the preferred base glass compositions consist essentially, expressed in weight percent on the oxide basis, of about 40–76% $SiO_2$, 4–26% $B_2O_3$, 4–26% $Al_2O_3$, and at least one alkali metal oxide ($R_2O$) in the indicated proportion of 2–8% $Li_2O$, 4–15% $Na_2O$, 4–15% $K_2O$, 8–25% $Rb_2O$, and 10–30% $Cs_2O$, the sum of those components plus the silver halides constituting at least 85% by weight of the total composition.

Finally, the patent observes that, where a transparent photochromic glass article is desired, the composition thereof will not contain more than 0.7% silver or more than 0.6% total of the three halides, and the content and size of the silver halide crystals will not exceed 0.1% by volume and 0.1 micron, respectively.

Ophthalmic lenses, both as prescription lenses and as non-prescription sunglasses, have comprised the largest commercial application of photochromic glass. Prescription lenses, marketed by Corning Glass Works, Corning, New York under the trademark PHOTOGRAY, have formed the greatest segment of the ophthalmic sales. The composition of that glass falls within the disclosure of U.S. Pat. No. 3,208,860, supra, an approximate analysis therefor in weight percent being:

| | |
|---|---|
| $SiO_2$ | 55.6 |
| $B_2O_3$ | 16.4 |
| $Al_2O_3$ | 8.9 |
| $Li_2O$ | 2.65 |
| $Na_2O$ | 1.85 |
| $K_2O$ | 0.01 |
| BaO | 6.7 |
| CaO | 0.2 |
| PbO | 5.0 |
| $ZrO_2$ | 2.2 |
| Ag | 0.16 |
| Cu | 0.035 |
| Cl | 0.24 |
| Br | 0.145 |
| F | 0.19 |

Because PHOTOGRAY brand glass was developed through compromises with respect to such factors as photochromic behavior, ophthalmic properties, the capability for being chemically strengthened, and melting and forming characteristics, research has been ongoing to produce glasses having improved photochromic properties while still retaining the other qualitites necessary for a practical commercial glass.

U.S. application Ser. No. 14,981, filed Feb. 28, 1979 in the names of G. B. Hares, D. L. Morse, T. P. Seward, III, and D. W. Smith, now U.S. Pat. No. 4,190,451 discloses glasses demonstrating improved photochromic behavior when compared with PHOTOGRAY brand glass, i.e., such glasses darken to a lower transmission when exposed to actinic radiation and fade more rapidly when the actinic radiation is removed. That application describes glasses having compositions consisting essentially, in weight percent on the oxide basis, of:

| | |
|---|---|
| $SiO_2$ | 20–65 |
| $B_2O_3$ | 14–23 |
| $Al_2O_3$ | 5–25 |
| $P_2O_5$ | 0–25 |
| $Li_2O$ | 0–2.5 |
| $Na_2O$ | 0–9 |
| $K_2O$ | 0–17 |
| $Cs_2O$ | 0–6 |
| $Li_2O + Na_2O + K_2O + Cs_2O$ | 8–20 |
| CuO | 0.004–0.02 |
| Ag | 0.15–0.3 |
| Cl | 0.1–0.25 |
| Br | 0.1–0.2 | wherein the molar ratio alkali metal oxide:$B_2O_3$ ranges between about 0.55–0.85 in those compositions which are essentially free from divalent metal oxides other than CuO, and the weight ratio Ag:(Cl+Br) ranges between about 0.65–0.95.

Recently, a new photochromic glass for ophthalmic applications having a composition encompassed within that disclosure was entered into the marketplace by Corning Glass Works, Corning, N.Y. under the trademark PHOTOGRAY EXTRA and cataloged as Code 8111 glass. That glass has the following approximate analysis, in weight percent, of:

| | |
|---|---|
| $SiO_2$ | 55.8 |
| $Al_2O_3$ | 6.48 |
| $B_2O_3$ | 18.0 |
| $Li_2O$ | 1.88 |
| $Na_2O$ | 4.04 |
| $K_2O$ | 5.76 |
| $ZrO_2$ | 4.89 |
| $TiO_2$ | 2.17 |
| CuO | 0.011 |
| Ag | 0.24 |
| Cl | 0.20 |
| Br | 0.13 |

In order to better control growth of the silver halide crystals with consequent better uniformity and reproducibility of photochromic behavior, the proper glass-forming batches are melted, the melt cooled sufficiently rapidly to yield a glass shape, and this glass shape thereafter subjected to a heat treatment to nucleate and grow the silver halide crystals. The PHOTOGRAY and PHOTOGRAY EXTRA brand glasses darken to a neutral or gray color when exposed to actinic radiation. However, in light of interest in the marketplace for a photochromic ophthalmic lens which would darken to a brown hue, lens blanks were produced and sold by Corning Glass Works under the trademark PHOTOBROWN. Those lens blanks were prepared via a particular heat treatment being applied to glass compositions within narrowly-defined ranges. A description of their preparation is set forth in U.S. Pat. No. 4,043,781. Thus, glasses consisting essentially, in weight percent on the oxide basis, of

| | |
|---|---|
| $SiO_2$ | 53–60 |
| $Al_2O_3$ | 8–10 |
| $B_2O_3$ | 15–18 |
| $Na_2O$ | 1–3 |
| $Li_2O$ | 1.5–3.2 |
| BaO | 5–9 |
| PbO | 3.5–7 |
| $ZrO_2$ | 0–4 |
| CuO | 0.012–0.040 |
| Ag | 0.14–0.22 |
| Cl | 0.22–0.36 |
| Br | 0.10–0.20 |
| F | 0–1 | are subjected first to a temperature within the range of 520°–580° C. for about 2–30 minutes and thereafter exposed to a temperature within the range of 600°–660° C. for about 5–60 minutes.

As can readily be observed, the utility of the method is limited to a narrow range of glass compositions and, hence, the breadth of photochromic behavior which can be enjoyed is likewise narrowly limited. For example, the composition of PHOTOGRAY EXTRA brand glass falls outside the purview of that disclosure and, indeed, the patented heat treatment disclosed in U.S. Pat. No. 4,043,781 does not lead to the development of a brownish tint in that glass in the darkened state. Modifications in the disclosed heat treatments can induce a slight brownish cast in that glass in the darkened state but only at the expense of obtaining less desirable photochromic properties.

Of course, the addition of colorants to glass compositions to produce various colorations therein is well known to the art. Hence, for example, a combination of cobalt, nickel, and manganese has been utilized to achieve a brown coloration in glass (U.S. Pat. No. 4,116,704). Also, U.S. Pat. No. 4,018,965 discloses the addition of colorants such as the rare earth metal oxides $Er_2O_3$, $Pr_2O_3$, $Ho_2O_3$, and $Nd_2O_3$ and/or the transition metal oxides CoO, NiO, and $Cr_2O_3$ to develop various tints in photochromic glass compositions. Thus, that patent discloses the use of up to 1% total of those transition metal oxides selected in the indicated proportions of 0–0.5% CoO, 0–1% NiO, and 0–1% $Cr_2O_3$, and/or up to 5% total of those rare earth metal oxides. However, it is apparent that such colorants yield a glass having a permanent tint therein rather than an essentially uncolored glass in the faded state.

OBJECTIVE OF THE INVENTION

The primary objective of the instant invention is to provide a transparent, essentially colorless, photochromic glass which, when exposed to actinic radiation, will darken to a brownish hue but, when removed from the actinic radiation, will return to an essentially colorless appearance.

SUMMARY OF THE INVENTION

That objective can be achieved through the addition of little more than trace amounts of palladium and/or gold to the batch for a photochromic glass wherein crystals of silver chloride, silver bromide, and/or silver iodide impart the photochromic behavior to the glass. Those additions have essentially no effect upon the original appearance of the glass but cause the hue of the darkened color to shift towards the brown with little or no change in the transmittance of the darkened state.

The mechanism operating to generate this shift in color is not fully understood but, because the color is produced with extremely low levels of palladium and/or gold, it has been theorized that the color is due to palladium and/or gold being contained within or deposited upon the surface of the silver halide crystals. Thus, it is postulated that the silver halide crystals have palladium and/or gold particles on the surface thereof or, alternatively, dispersed within the structure thereof.

Inasmuch as the operable concentrations of palladium and/or gold are very minute, i.e., as little as one part per million (ppm), the initial luminous transmittance and freedom from color demonstrated by the glass are substantially unaffected. When more than about 10 ppm are included, however, the initial transmittance and color are obviously affected. Additions of about two to four ppm are deemed to be optimum with about three ppm being considered the most preferred. As a matter of fact, the darkened brownish hue, as defined by chromaticity coordinates, appears to reach a peak in the vicinity of about three to four ppm.

The presence of palladium and/or gold enables the production of the desired brown coloration in the darkened state without the necessity of utilizing a special heat treatment of the glass, such as is described in U.S. Pat. No. 4,043,781, supra. And, as has been explained above, glass composition is not critical except for the presence of silver halide crystals. However, because of the inherent photochromic properties developed therein, the glass compositions of Ser. No. 14,981, supra, are preferred.

DESCRIPTION OF THE PREFERRED EMBODIMENTS

Table I illustrates the effect of palladium additions upon the luminous transmittance and darkened chromaticity of Code 8111 glass. The palladium was added in the form of an aqueous solution of $PdCl_2$ to the batch to yield the recited contents in ppm. The batch was melted in a commercial continuous tank customarily utilized for melting Code 8111 glass. The melt was pressed into standard lens blanks which were then subjected to the heat treatment schedule conventionally employed in a lehr with Code 8111 glass to generate photochromic behavior therein. This heat treatment involves heating the glass to about 650° C. for approximately one-half hour and then cooling at a rate which will yield a satisfactory state of anneal.

Color and photochromic properties were determined utilizing a conventional tristimulus colorimeter and laboratory exposure/photometer system. Each lens blank was ground and polished to yield a thickness of 2 mm. Those specimens were exposed to a source of ultraviolet radiation for 5 minutes at room temperature (~20°–25° C.) and then removed from the radiation for five minutes. Table I reports the luminous transmittances exhibited by each sample before darkening ($T_0$), after darkening for five minutes ($T_{D5}$), after fading for five minutes ($T_{F5}$), and the amount of fading from the darkened state demonstrated after five minutes, removal from the radiation ($T_{F5}-T_{D5}$), this latter value being termed "5 minute fade" in the art. Table I also records the chromaticity coordinates (x,y) of the darkened specimens utilizing Illuminant C.

TABLE I

| Pd ppm | $T_o$ | $T_{D5}$ | $T_{F5}$ | $T_{F5-D5}$ | x | y |
|---|---|---|---|---|---|---|
| 0 | 91 | 34 | 71 | 37 | 0.3140 | 0.3160 |
| 1 | 89.5 | 35 | 72 | 37 | 0.3350 | 0.3275 |
| 2 | 88.5 | 36 | 73 | 37 | 0.3460 | 0.3360 |
| 3 | 87 | 37 | 73 | 36 | 0.3475 | 0.3370 |
| 5 | 86.5 | 38 | 74 | 36 | 0.3340 | 0.3340 |

As can be observed from Table I, palladium additions at about the 3 ppm level are preferred because: (1) the darkened color has a slight red cast, hence a warm brown, rather than a yellow element therein; and (2) the undarkened transmittance of the glass is not substantially affected thereby. It is interesting to note, via a study of the chromaticity coordinates, that the color passes through a peak at about 3 ppm Pd with larger additions causing a return towards neutral gray brought about via an addition of a blue component. Moreoever, further additions tend to have a substantive effect upon the undarkened transmittance of the glass. Accordingly, levels of about 2-4 ppm are preferred. The preferred color has coordinates at approximately x=0.3228 and y=0.3187 and is deemed to exhibit a more pleasing hue than the color produced via the disclosure of U.S. Pat. No. 4,043,781, supra.

Metallic gold appears to behave in a manner similar to that displayed by palladium. Table II sets forth several glass compositions, expressed in parts by weight on the oxide basis as calculated from the batch, designed to illustrate this phenomenon. Inasmuch as it is not known with what cation(s) the halides are combined, they are merely reported as the halide, i.e., chloride and bromide, in accordance with conventional glass analysis practice. The silver content of photochromic glass has most generally been recited as the metal Ag, and that practice is adhered to here. Since the sum of the individual constituents of each composition closely approximates 100, for all practical purposes the quantities tabulated may be considered to indicate weight percent.

The actual batch ingredients of the base glass compositions can comprise any materials, either the oxide or other compound, which, when melted in conjunction with the other components, will be converted into the desired oxide in the proper proportions. Out of convenience, the halides were commonly added as alkali metal halides, the silver component was normally included as $AgNO_3$ or $Ag_2O$, and the gold was added as a 2% by weight color batch of gold chloride in sand.

The batch ingredients were compounded to prepare about 1000 g of each composition, the batches tumblemilled thoroughly to aid in securing a homogeneous melt, and then deposited into platinum crucibles. The crucibles were covered with silica lids, placed into a laboratory furnace operating at about 1450° C., and maintained therein for about three hours. The melts were then stirred with a platinum-rhodium stirrer. The bulk of each melt was poured into a steel mold to yield a glass slab having the dimensions of about 10"×4"×½" with the remainder being poured onto a steel plate as a small, free-flowing glass patty. The large slabs were immediately transferred to an annealer operating at 375° C. and held therewithin for two hours. The small patties were simply allowed to cool to room temperature in the ambient environment.

TABLE II

| | 1 | 2 | 3 | 4 |
|---|---|---|---|---|
| $SiO_2$ | 62.6 | 62.6 | 62.6 | 62.6 |
| $B_2O_3$ | 16.9 | 16.9 | 16.9 | 16.9 |
| $Al_2O_3$ | 9.5 | 9.5 | 9.5 | 9.5 |
| $Na_2O$ | 3.8 | 3.8 | 3.8 | 3.8 |
| $Li_2O$ | 1.8 | 1.8 | 1.8 | 1.8 |
| $K_2O$ | 4.9 | 4.9 | 4.9 | 4.9 |
| Ag | 0.25 | 0.25 | 0.25 | 0.25 |
| CuO | 0.012 | 0.012 | 0.012 | 0.012 |
| Cl | 0.15 | 0.15 | 0.15 | 0.15 |
| Br | 0.16 | 0.16 | 0.16 | 0.16 |
| Au | — | 0.0005 | 0.001 | 0.0015 |

Color and photochromic properties determined on 2 mm thick ground and polished samples taken from the small, unannealed patties which had been heated at 660° C. for 30 minutes and then allowed to cool to room temperature in the ambient atmosphere are listed in Table III. The measurements were performed employing a solar simulator apparatus similar to that described in U.S. Pat. No. 4,125,775. The darkened luminous transmittance for eight spectral wavelengths (400 nm, 440 nm, 480 nm, 530 nm, 580 nm, 640 nm, 685 nm, and 735 nm) was measured simultaneously utilizing eight suitably filtered P/N silicon photodiodes. The apparatus was interfaced to a PDP-11/04 computer (marketed by Digital Equipment Corporation, Maynard, Mass.) and the chromaticity values calculated by a modification of the weighted ordinate method (A. C. Hardy, *Handbook of Colorimetry*, Technology Press, page 33, 1936).

In like manner to Table I, $T_0$ represents the luminous transmittance of each sample before darkening, $T_{D5}$ indicates the transmittance after a five-minute exposure to the solar simulator, $T_{F5}$ designates the transmittance after a removal of five minutes from the solar simulator, $T_{F5}-T_{D5}$ the amount of fading undergone after five minutes, and x and y are the chromaticity coordinates of the darkened samples utilizing Illuminant C.

TABLE III

| Example No. | $T_o$ | $T_{D5}$ | $T_{F5}$ | $T_{F5-D5}$ | x | y |
|---|---|---|---|---|---|---|
| 1 | 90.6 | 43.1 | 72.3 | 29.8 | 0.3276 | 0.3235 |
| 2 | 86.5 | 37.7 | 67.1 | 29.4 | 0.3668 | 0.3406 |
| 3 | 81.6 | 35.0 | 64.9 | 29.9 | 0.3670 | 0.3393 |
| 4 | 70.1 | 30.6 | 58.0 | 28.4 | 0.3715 | 0.3339 |

Table III clearly illustrates the capability of gold to cause the production of a brown coloration in the darkened state of photochromic glasses. Examples 3 and 4 unequivocally demonstrate the effect upon the undarkened transmittance of the glass which additions of gold of 10 ppm and greater can exert. Furthermore, such greater additions yield a deeper brown coloration in the darkened state of the glass. Again, the warmest brown colorations appear to be observed with gold additions in the 2-4 ppm range.

As manifested in Table III, Example 4, containing 15 ppm gold, exhibited an undarkened transmittance of only about 70%. However, the use of lower heat treatment temperatures to develop photochromic properties can result in glasses with higher undarkened transmittances. Table IV illustrates this phenomenon through a comparison of samples cut from the annealed slabs of Examples 1 and 4 which were subsequently subjected to three different heat treatments. The measurements recited in Table IV were made in like manner to those reported in Table III. Also, the legends appearing in Table IV have the same meaning as in Table III.

TABLE IV

| Heat Treatment 610° C. for 30 Minutes | | | | | | |
|---|---|---|---|---|---|---|
| Example No. | $T_o$ | $T_{D5}$ | $T_{F5}$ | $T_{F5-D5}$ | x | y |
| 1 | 91.4 | 74.1 | 85.6 | 11 | 0.3198 | 0.3226 |
| 4 | 85.4 | 55.0 | 74.2 | 19.2 | 0.3476 | 0.3387 |

| Heat Treatment 630° C. for 30 minutes | | | | | | |
|---|---|---|---|---|---|---|
| Example No. | $T_o$ | $T_{D5}$ | $T_{F5}$ | $T_{F5-D5}$ | x | y |
| 1 | 90.9 | 57.5 | 75.2 | 17.7 | 0.3243 | 0.3224 |
| 4 | 77.9 | 40.3 | 64.6 | 24.6 | 0.3524 | 0.3330 |

| Heat Treatment 660° C. for 30 Minutes | | | | | | |
|---|---|---|---|---|---|---|
| Example No. | $T_o$ | $T_{D5}$ | $T_{F5}$ | $T_{F5-D5}$ | x | y |
| 1 | 89.5 | 34.8 | 64.8 | 30 | 0.3382 | 0.3285 |
| 4 | 66.3 | 26.4 | 52.7 | 26.3 | 0.3721 | 0.3287 |

Accordingly, because of these differences in color which can be achieved in the undarkened state in glasses containing relatively high levels of gold and/or palladium, e.g., about 10 ppm, it is quite possible, through differential heat treatment thereof, to make such glasses to exhibit a gradient optical density brownish tint in the undarkened state and also demonstrate a gradient photochromic darkening behavior to a deeper brownish coloration. One method for achieving such differential heat treatment involves the use of a heat sink such as is described in U.S. Pat. No. 4,072,490. The example cited below is illustrative of that practice.

A glass having the following composition, the base components being calculated in terms of parts by weight on the oxide basis from the batch ingredients and the "photochromic elements", i.e., the Cl, Br, CuO, and Ag, being analyzed via X-ray fluorescence, was melted and blanks for ophthalmic lenses pressed therefrom. The gold was again incorporated into the melt as a 2% by weight color batch of gold chloride in sand.

| | |
|---|---|
| $SiO_2$ | 56.6 |
| $Al_2O_3$ | 6.3 |
| $B_2O_3$ | 18.2 |
| $Na_2O$ | 4.1 |
| $Li_2O$ | 1.8 |
| $K_2O$ | 5.7 |
| $ZrO_2$ | 5.0 |
| $TiO_2$ | 2.3 |
| Au | 0.002 |
| Cl | 0.163 |
| Br | 0.133 |
| CuO | 0.013 |
| Ag | 0.224 |

After annealing the blanks in a lehr operating at 500° C., 3 mm, 6 diopter lenses were ground and polished therefrom. Those lenses were then placed onto heat sink ceramic formers and the formers placed in a lehr which was scheduled such that the lenses were exposed to a peak temperature zone of about 670° C. for about 15 minutes. This treatment yielded lenses manifesting a distinct golden brown tint in that portion of the lens which had been exposed to the 670° C. heat treatment with the other portion of the lens being essentially colorless.

Color and photochromic properties were determined on each portion of the lenses utilizing the apparatus described above in connection with the measurements reported in Table III, the thickness of the lenses being 3 mm instead of 2 mm. Table V records the results of those determinations, the legends appearing therein having the same definitions as those of Table III except that D10 refers to darkening under ultraviolet radiation for 10 minutes.

TABLE V

| Sample | $T_o$ | $x_o$ | $y_o$ | $T_{D10}$ | $x_{D10}$ | $y_{D10}$ |
|---|---|---|---|---|---|---|
| Dark Portion | 78.6 | 0.3279 | 0.3383 | 53.1 | 0.3667 | 0.3582 |
| Light Portion | 87.4 | 0.3160 | 0.3286 | 81.1 | 0.3278 | 0.3394 |

Another technique for achieving a gradient heat treatment comprises placing the lens onto a ceramic former and burying about one-half of that combination in a suitably upright position in sand, alumina, or other suitable refractory material in particulate form. The assembly can then be placed in a furnace and subjected to a predetermined heat treatment.

Lenses of 2 mm thickness were ground and polished from a glass having the above composition but wherein 16 ppm palladium (0.0016%) were substituted for the gold. The lenses were placed upon ceramic formers and about one-half of the combination was buried in finely-divided alumina particles. Color and photochromic characteristics of the two portions of the lenses were determined after exposure of the assembly to 640° C. for 10 minutes. The measuring apparatus was again the same as that described above. Table VI reports the results of those determinations, the legends therein reflecting the same meaning as those set forth in Table V.

TABLE VI

| Sample | $T_o$ | $x_o$ | $y_o$ | $T_{D10}$ | $x_{D10}$ | $y_{D10}$ |
|---|---|---|---|---|---|---|
| Dark Half | 81.3 | 0.3210 | 0.3324 | 42.2 | 0.3412 | 0.3416 |
| Light Half | 89.5 | 0.3124 | 0.3225 | 85.6 | 0.3151 | 0.3251 |

That the use of colorants to permanently tint photochromic glasses is well known to the art has been observed above. The present invention permits those tints to be complemented through the addition of a warm brown darkened hue thereto. For example, a warm brown hue in the darkened state can be imposed upon the permanent pink tint imparted to a glass through the inclusion of $Er_2O_3$ in the composition thereof.

As has been explained above, the inclusion of gold and/or palladium in amounts exceeding about 10 ppm substantively effects the initial color and transmittance of the glasses. Nevertheless, where this phenomenon is not undesirable, even larger quantities of those metals can be included, e.g., up to 50 ppm. Such additions, however, may exceed their solubility in the glass compositions, thereby giving rise to the development of haze in the glass bodies due to the presence of particles therein.

Additions of platinum and/or rhodium and/or iridium to the glass compositions appear to generate a similar phenomenon in silver halide-containing photochromic glasses of a brownish tint in the darkened state. However, the effectiveness of such additions is far less than that demonstrated by palladium and/or gold, therefore requiring much greater additions. Accordingly, the use of palladium and/or gold is much more economically attractive.

I claim:

1. A transparent photochromic glass containing about 1–10 ppm palladium and/or gold which is essentially colorless in the undarkened state, but which exhibits a warm brown coloration in the darkened state, wherein crystals of at least one silver halide selected from the group of silver chloride, silver bromide, and silver iodide impart the photochromic behavior to the glass.

2. A transparent photochromic glass according to claim 1 wherein the glass composition consists essentially, expressed in weight percent on the oxide basis, of about 40–76% $SiO_2$, 4–26% $Al_2O_3$, 4–26% $B_2O_3$, at least one alkali metal oxide in the indicated proportion of 2–8% $Li_2O$, 4–15% $Na_2O$, 4–15% $K_2O$, 8–25% $Rb_2O$, and 10–30% $Cs_2O$, at least one halogen in the indicated minimum effective proportion of 0.2% chlorine, 0.1% bromine, and 0.08% iodine and a minimum of silver in the indicated proportion of 0.2% in a glass wherein the effective halogen is chlorine, 0.05% in a glass containing at least 0.1% bromine, but less than 0.8% iodine, and 0.03% in a glass containing at least 0.08% iodine, the sum of those components constituting at least 85% by weight of the total composition.

3. A transparent photochromic glass according to claim 1 wherein said glass composition consists essentially, expressed in weight percent on the oxide basis, of 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% $CuO$, 0.15–0.3% Ag, 0.1–0.25% Cl, and 0.1–0.2% Br, wherein the molar ratio alkali metal oxide:$B_2O_3$ ranges between about 0.55–0.85 in those compositions which are essentially free from divalent metal oxides other than $CuO$, and the weight ratio Ag:(Cl+Br) ranges between about 0.65–0.95.

4. A transparent photochromic glass according to claim 1 wherein said glass contains about 2–4 ppm palladium and/or gold.

5. A transparent photochromic glass containing in excess of 10 ppm palladium and/or gold which exhibits a brown coloration in the undarkened state and a deeper, warm brown coloration in the darkened state, wherein crystals of at least one silver halide selected from the group of silver chloride, silver bromide, and silver iodide impart the photochromic behavior to the glass.

6. A transparent photochromic glass containing in excess of 10 ppm palladium and/or gold which exhibits a gradient density brownish tint in the undarkened state and also demonstrates a gradient photochromic darkening behavior to a deeper, warm brown coloration, wherein crystals of at least one silver halide selected from the group of silver chloride, silver bromide, and silver iodide impart the photochromic behavior to the glass.

7. A transparent photochromic glass containing about 1–50 ppm palladium and/or gold and containing up to 1% total of transition metal oxide colorants selected from the group of 0–0.5% CoO, 0–1% NiO, and 0–1% $Cr_2O_3$ and/or up to 5% total of rare earth metal oxide colorants selected from the group of $Er_2O_3$, $Pr_2O_3$, $Ho_2O_3$, and $Nd_2O_3$ which exhibits a particular tint in the undarkened state, but which tint is complemented with a warm brown hue in the darkened state, wherein crystals of at least one silver halide selected from the group of silver chloride, silver bromide, and silver iodide impart the photochromic behavior to the glass.

* * * * *